(12) United States Patent
Olsson

(10) Patent No.: US 11,396,058 B2
(45) Date of Patent: Jul. 26, 2022

(54) ELECTRIC CONNECTOR ENGAGING A WELDER TO A SPOT WELDING TOOL

(71) Applicant: Joran Olsson, Carlsbad, CA (US)

(72) Inventor: Joran Olsson, Carlsbad, CA (US)

(*) Notice: Subject to any disclaimer, the term of this patent is extended or adjusted under 35 U.S.C. 154(b) by 0 days.

(21) Appl. No.: 16/954,910

(22) PCT Filed: Jun. 15, 2020

(86) PCT No.: PCT/US2020/037809
§ 371 (c)(1),
(2) Date: Jun. 17, 2020

(87) PCT Pub. No.: WO2020/252482
PCT Pub. Date: Dec. 17, 2020

(65) Prior Publication Data
US 2022/0126391 A1 Apr. 28, 2022

Related U.S. Application Data

(60) Provisional application No. 62/861,722, filed on Jun. 14, 2019.

(51) Int. Cl.
*B23K 11/31* (2006.01)
*F16B 7/14* (2006.01)

(52) U.S. Cl.
CPC .......... *B23K 11/314* (2013.01); *F16B 7/1409* (2013.01)

(58) Field of Classification Search
CPC ... B23K 11/314; B23K 11/362; B23K 11/315; F16B 7/1409
USPC .............................. 219/86.25, 86.33, 86.8, 90
See application file for complete search history.

(56) References Cited

U.S. PATENT DOCUMENTS

| | | | | |
|---|---|---|---|---|
| 3,743,816 A | * | 7/1973 | Sato | B23K 11/31 219/86.33 |
| 2015/0108099 A1 | * | 4/2015 | Ferrero | B23K 11/314 219/86.33 |

FOREIGN PATENT DOCUMENTS

| CN | 102357728 | * | 2/2012 | ............. B23K 11/31 |

* cited by examiner

*Primary Examiner* — Dana Ross
*Assistant Examiner* — James F Sims, III
(74) *Attorney, Agent, or Firm* — Donn K. Harms

(57) ABSTRACT

A electrical connector for removably engaging a welder to a spot welding tool having a first arm in a pivoting engagement to a second arm. The connector features an electrically conductive member engaged to or forming a powered translating shaft of a welder which is surrounded by a housing. The connector engages within a passage formed in a coupling to communicate forward and rearward movement and electric current to a first arm of a spot welding tool.

6 Claims, 2 Drawing Sheets

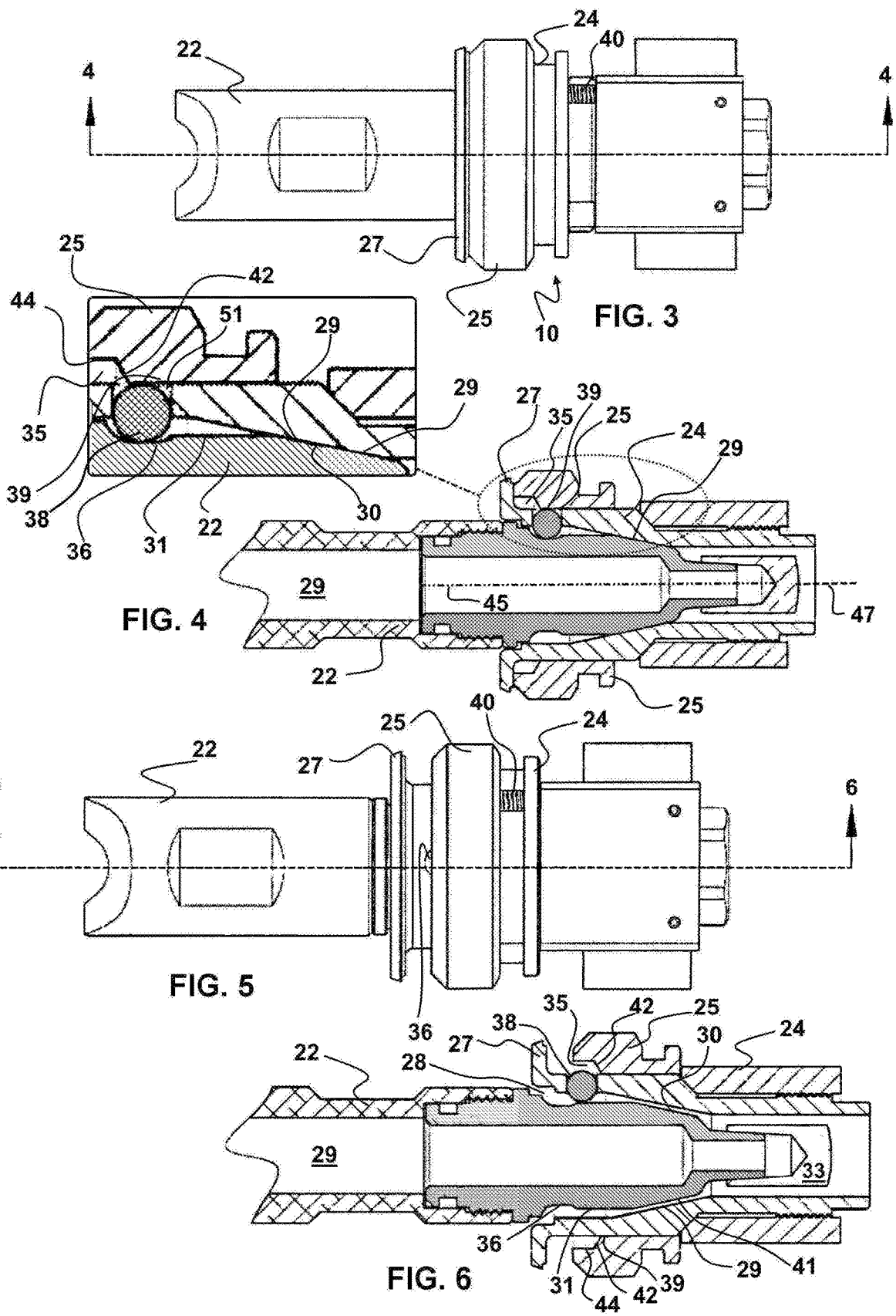

ELECTRIC CONNECTOR ENGAGING A WELDER TO A SPOT WELDING TOOL

This application claims priority to U.S. Provisional Patent Application Ser. No. 62/861,722 filed on Jun. 14, 2019, which is incorporated herein in its entirety by this reference thereto.

The disclosed device relates to the field of resistance welding more commonly known as spot welding. More particularly, this invention relates to an electrical connector having a receiving component or coupling adapted for positioning upon a hand held resistance or spot welding tool to communicate electric current thereto from a conductive member. The device herein employs a projecting translatable conductive member which is engaged to the welder or welding gun and which is configured to slide to a locked electric connection with the receiving component coupling located on the so called C-type or X-type welding tool which is operatively engaged to the welder or welding gun.

BACKGROUND OF THE INVENTION

Spot welding or resistance welding is a common manufacturing procedure of permanently engaging points upon two or more pieces of metal material through the formation of a spot weld at a point of contact between two electrodes or compression point. Prior to communication of electric current to the two electrodes positioned on opposite sides of the metal layers to be welded, force is applied between the electrodes to compress them on opposite sides of the metal layers at the spot welding point. Once the metal layers are in a sandwiched engagement in between the two opposing electrodes, positive electric current is triggered to communicate to one of the electrodes which travels through the metal layers at the compression point and to the second electrode which is engaged to a ground. Of course this current flow can be reversed.

The electric current is conventionally communicated at significant amperage for a period of time whereupon resistance from the metal material positioned between the electrodes, generates heat sufficient to melt it and weld the multiple metal layers together permanently. This type of spot welding is widely used in manufacturing and automotive industries and requires no filler metal or flux during the process.

In modern automotive manufacturing, a significant amount of the assembly of metal parts is accomplished with spot welding guns operated by robotic arms. In automotive repair, the same spot welding procedure is employed using compressive tooling components allowing for the portable positioning of the two spot welding electrodes to the spot welding point.

In such application, where the welding tool needs to be as rigid as possible due to the high applying forces (e.g. welding of thick materials), the C-type gun attachment is widely used. As well as the high resulting rigidity, this arrangement leads to a high tooling flexibility, as the motion of the electrodes is collinear. Unlike the C-type, the so called X-type electrode and tool arrangement provides less rigidity. However, because the members holding the two electrodes are engaged at a point to yield an X configuration, the space between the two spot electrodes may be larger and the reachable workspace is far larger than with the C-type.

With both configurations however, the electric current to achieve the resulting spot weld, when the two welding electrodes are compressed against the metal layers, must be provided by an electric connection to a conductive member, which interfaces between the welder and the spot welding electrodes. Conventionally, this conductive member, may also serve to provide the force to the arms and welding electrodes at the spot weld site, to engage both opposing spot weld electrodes compressively.

To that end, both the C-type and X-type tools are placed in a fixed engagement to a housing of a gun or welder, which employs a translating member which is mechanically or hydraulically or electrically powered to impart a force upon translation in either of two directions. A trigger activator, in this arrangement, activates the power exerting the force to the translating member, to compress the first and second electrodes against opposite sides of the spot weld whereupon the electric current is activated to achieve the spot weld. The same trigger or release thereof is employable to reverse the force and move a pivoting arm and the electrode thereon away from the opposing electrode, to reinstate the gap therebetween.

However, conventional spot welders have time consuming configurations for the connectors for the translating member to the spot welder which are not easily engaged or disengaged.

The forgoing examples of related art of connectors for spot welders and limitations related therewith are intended to be illustrative and not exclusive, and they do not imply any limitations on the invention described and claimed herein. Various limitations of the related art in spot welding will become apparent to those skilled in the art upon a reading and understanding of the specification below and the accompanying drawings.

SUMMARY OF THE INVENTION

In this description, any directional prepositions if employed, such as up, upwardly, down, downwardly, front, back, top, upper, bottom, lower, left, right and other such terms refer to the device or depictions as they may be oriented are for convenience only in describing such as it appears in the drawings. Such terms of direction and location are not intended to be limiting in ay fashion, or to imply that the device or method herein has to be used or positioned with graphics in any particular orientation. Further, in not otherwise defined, by the term substantially is meant, plus or minus five percent.

The device herein disclosed describes a new and unique two piece electrical connector, which automatically engages, for communicating electric current and linear travel under force, from a conductive translating member, to a conventional C-type or X-type hand held spot welding component. Such C-type and X-type welding components or guns are well known in the industry where spot welding of metal layers is required, such as automotive manufacturing and repair.

Conventionally, they employ a first electrode engaged on a first arm which is in a pivoting connection with a second arm having the second electrode thereon. Force from the travel of a powered member is employed to rotate one of the two arms on the pivot therebetween and thereby imparts a compressive force in between the first electrode and second electrode at a compression point. A spot weld on metal positioned in this compression point is achieved when electric current is communicated to the two electrodes through the two arms.

The device herein, provides a two piece connector which automatically engages for use. The translating member at a first end is in operative communication with a hydraulic, mechanical, electric, or other powered component imparting a force in two directions upon the member during use. This translating force on the translating member, when communicated to the C-type or X-type spot welder attachment, provides the force to both close and compress the electrodes, as well as to move them apart once the weld is achieved.

This translating member is electrically conductive. It is also insulated from a surrounding housing to which the fixed second arm of the C-type or X-type spot welder is engaged. The translating member is adapted for engagement on the first end thereof with triggerable high amperage electric current which is employed to achieve the spot weld. In between the first end and the second end of the translating member is located a tapered portion. This tapered portion is configured to form a locked connection to a coupling having a tapered recess therein which mirrors the taper of the tapered portion of the exterior surface of the translating conductive member.

Preferably the tapered portion of the translating conductive member is formed around the entire exterior circumference thereof. The tapered recess in the coupling is formed into the entire exterior circumferential surface thereof. This achieves a maximized area of contact between the tapered exterior surface of the tapered portion of the member, and the tapered interior circumference of the recess of the coupling. This maximizes the area for communication of electric current therebetween.

An annular recess formed into the translating member adjacent the tapered portion is configured to engage with at least one and preferably a plurality of balls, projecting into the recess of the coupling. The tapered exterior surface area of the translating member upon linear movement into the coupling, forms a ramp. This ramp is preferred as it serves to more easily move the balls thereover and overcome a bias imparted thereto by a biasing member acting on the balls. By biasing member is meant a spring or other compressible member or the like. The biasing force from the biasing member continues to hold the balls once they settle into the annular recess.

In this fashion, the conductive and translating member self-locks into the coupling engaged to the rotating first arm, with the tapered exterior surface area of the member in full surface contact with the tapered interior surface of the passage. With this full contact between the two surfaces the communication of electric current from the conductive member is maximized to the coupling, and to the first arm which is electrically connected thereto.

As noted, the coupling is electrically conductive and engaged to one of the first arm or second arm of the C-type or X-type spot welder attachments and also in electric engagement therewith. Consequently, electric current communicated to the conductive translating member is communicated to and through the coupling and to the arm to which it is engaged thereto, such as one form the C-type or X-type spot welder. The other arm is conventionally placed in fixed engagement which is grounded, such as with a connector such as a compressible collar to the housing surrounding the translating member. This housing is electrically insulated from the translating member using insulation such as a dialectic material, for example polymeric material.

Thereafter, force imparted to translate the conductive member while in locked engagement with the coupling, will cause movement of the arm of the spot welder which is engaged to that coupling. The second arm of the spot welders engaged to the housing remains fixed relative to the first arm moved by the translating member engaged with the coupling. Thus, an opening and compressive closing of the two electrodes on distal ends of the two arms is accomplished by the force of the linear movement of the conductive member while it is engaged with the coupling.

Electric current to form a spot weld on metal, is delivered once triggered, through the two electrodes on the distal ends of the arms, from the translating conductive member in the locked engagement with the coupling and the grounded second arm. As is well known, one arm will carry the positive current flow and the second of the arms will be grounded.

Disengagement of the self-locking connection and contact between the tapered exterior surface of the translating member with the mirrored tapered interior circumference of the recess formed into the coupling, is easily accomplished by urging a biased locking ring in a direction to release the biased force exerted on the balls. With the balls no longer biased into an engagement, the annular recess in the conductive member may be pulled from the engagement by a reverse translation in a direction away from the coupling. However, when the balls are biased and held in the annular recess, movement of the conductive member away from the coupling will open the jaws of the spot welder.

It is an object of this invention to provide a self-locking electric connector formed of a member and a coupling, which will maximize the electric contact between the two.

It is a further object of this invention to provide such a self-locking electric connector which will communicate powered liner movement, in two directions, from movements of a tapered conductive member to a moving arm of a C-type or X-type spot welder.

These together with other objects and advantages which become subsequently apparent reside in the details of the construction and operation as more fully hereinafter described and claimed, reference being made to the accompanying drawings forming a part thereof, wherein like numerals refer to like parts throughout.

BRIEF DESCRIPTION OF THE DRAWINGS

The accompanying drawings which are incorporated in and form a part of this specification illustrate embodiments of the invention and together with the description serve to explain the principles of this invention.

FIG. 3 shows the member in the locked engagement with the coupling as in FIG. 2 from an exterior view.

FIG. 4 is a sectional view along line 4-4 through FIG. 3.

FIG. 5 depicts the device of FIGS. 1-3 but moved to an unlocked connection by translating a spring biased ring to release the balls from the annular recess.

FIG. 6, is a sectional view along line 6-6 of FIG. 5.

DETAILED DESCRIPTION OF THE PREFERRED EMBODIMENTS

Figure 1:
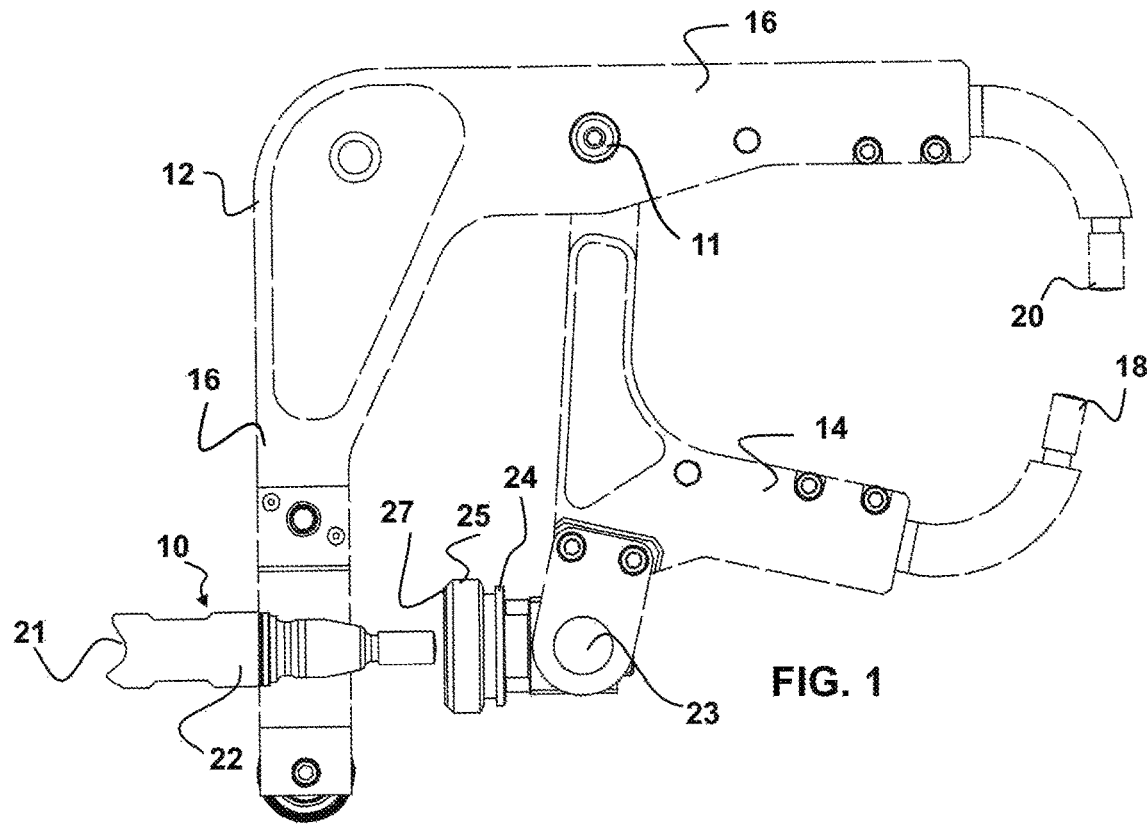
FIG. 1 depicts a conventional C-type or X-type spot welder having first and second arms in a pivoted engagement for which the device is adapted to engage and depicts the conductive tapered member of the connector herein communicating through a housing which is engaged with one arm of the welder, where the tapered portion of the conductive member engages within a mirrored tapered recess of a coupling connected which is connected to the other of the two arms.
Figure 2:
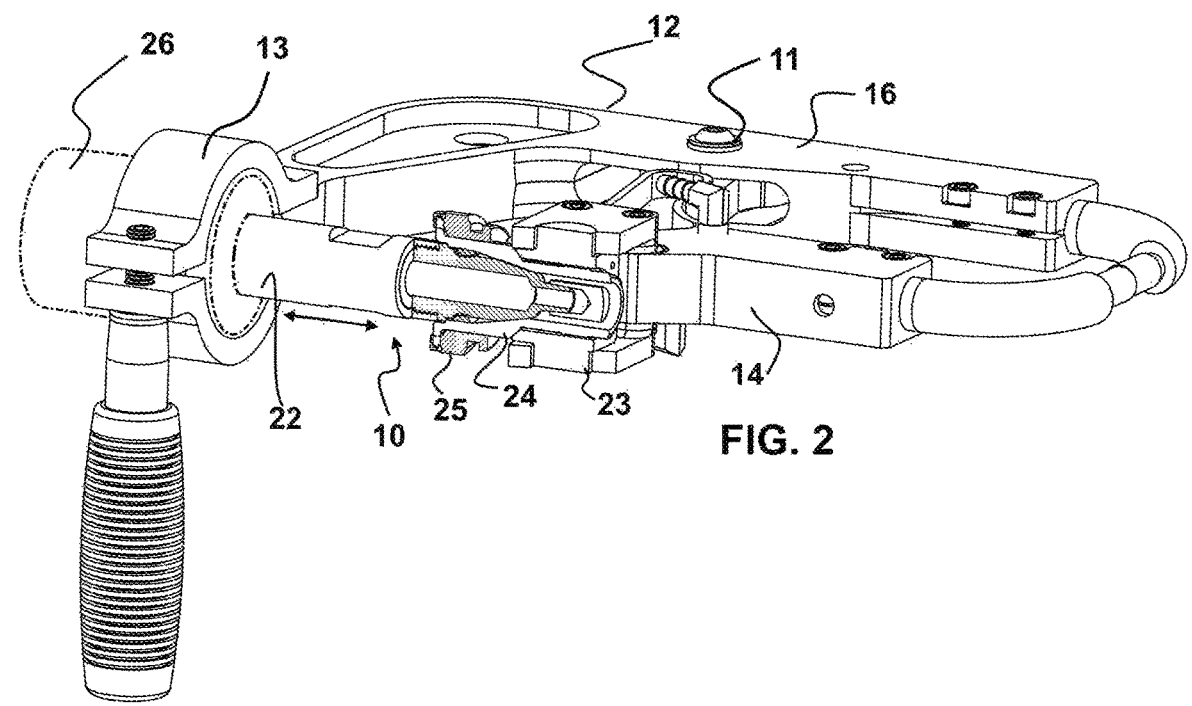
FIG. 2 shows a sectional view through the coupling with the conductive member in operative locked engagement therewith where the tapered circumferential portion of the conductive member is in contact with the tapered interior wall of the recess in the coupling and a plurality of balls are in biased engagement within the annular recess in the conductive member.

Referring now to the drawings of FIGS. 1-6, wherein similar parts of the invention are identified by like reference numerals. There is seen in FIGS. 1-2, the device 10 which provides an easy to engage and disengage, self locking electric connector, which is employable to communicate electric current when operatively connected to a conventional C-type or X-type spot welder 12.

As noted, such spot welders 12 conventionally have a first arm 14 which pivots in a rotational engagement with a second arm 16. In this rotational engagement the first arm 14 is electrically isolated from a second arm 16 such as with insulating washers and bushings formed of a polymeric material, which while not shown are well known in the art.

In operation of conventional spot welders 12, a first electrode 18 connected to the first arm 14 is translated into contact with the second electrode 20 engaged to the second arm 16 with metal therebetween, to form a spot weld. This is conventionally accomplished by the force from a motor or hydraulic driven member which translates back and forth to rotate the first arm 14 in its pivoting engagement 11 with the second arm 16. Such pivoting engagements 11 are conventionally accomplished, for example, by an axle communicating through an aperture in the second arm 16 and through a passage aligned with the aperture in the first arm 14. Insulating washers and bushings formed of polymeric or other dielectric material electrically separate the first arm 14 from the second arm 16 in such pivoting engagements 11.

The connector device 10 herein is adapted to engage with such spot welders 12 to provide the electric current necessary in their operation to form the spot weld. The connector device 10, because it is imparting force to the spot welder 12 to close the two electrodes to contact metal to be spot welded, is conventionally removably engaged to the moving arm, which as shown herein is the first arm 14 in the pivoting engagement 11 with a static second arm 16.

As seen in FIG. 1, an electrically conductive member 22, such as one formed from conductive metal such as copper or aluminum or another electrically conductive metal, forms one half of the connector device 10 herein. This conductive member 22 is configured at a connection end or second end to form a removable engagement to a electrically conductive coupling 24, which is engaged to the moving arm, which as shown herein is the first arm 14 to provide the movement to close the electrodes. As shown, the second end of the conductive member 22 engages with a coupling 24 which is in electrical engagement an operatively connected to the first arm 14 to rotate the first arm 14 and the engaged first electrode 18 toward the second arm 16 and second electrode 20.

In FIG. 2 can be seen another view of such an engagement to a conventional spot welder 12 component having a first arm 14 rotatable on and electrically isolated from a second arm 16. As shown, the conductive member 22 may be slidably engaged itself within a housing 26, or may be engaged to an existing laterally translating shaft on a resistance welder which translates within a housing 26. If formed to engage the translating shaft of existing resistance welders which are well known and have a electrically conductive translating shaft which slides axially within a housing 26 when triggered to do so, threads or other connective means at the first end can engage the two.

If formed as part of a resistive welder which has a housing 26, the conductive member 22 will itself may form the translating shaft within the housing and be engaged to a power source of the welder. The conducting member in this mode will, thus, translate within the housing 26 when triggered to do so. The conductive member 22 is configured at a second end to engage a coupling 24 attached to a first arm of a spot welder 12. As such, what is meant by configured to engage a translating shaft of a welder is meant that the first end of the conductive member 22 may be connected to a translating shaft of the welder or form it.

The engagement of the housing 26 surrounding the conductive member 22 with the first arm 16 of the spot welder 12 is configured to position the conductive member 22 in alignment of the axis of the axis 45 of the conductive member 22 with the axis 47 of the coupling 24. A removable engagement is formed between the second end of the conductive member 22 and a coupling 24 engaged with a first arm 14 of a spot welder 12.

This engagement by a fastener such as the shown collar 13 on the second arm 16 also isolates the second arm 16 electrically from any electric current in the conductive member 22. The second arm 16 in the depicted configurations would conventionally be grounded. In this engaged position, such as is also shown in FIG. 3-4, the conductive member 22 communicates electric current when triggered to do so to the first arm 14 pf the spot welder 12 for forming a spot weld in between the electrodes 18-20 when they are compressed on metal. The second arm 11 may be electrically grounded to allow completion of the circuit wherein metal placed between the first electrode 18 and second electrode 20 will be spot welded.

In a preferred mode of the device 10, the conductive member 22 is engaged within the housing 26 which surrounds it, and electrically isolates the second arm 16 connected thereto by a fastener such as the shown collar 13. The conductive member 22 is connected at a first end to a powered translation means such as a hydraulic ram, electric motor, or gear train, which may be triggered to communicate force to the conductive member 22 to translate toward or away from the coupling 24.

This back and forth translation of the conductive member 22 may be at a force moving toward the coupling 24 or away from the coupling 24, such that a force to close the gap between the electrodes 18 and 20 can be imparted, as well as a force to move them apart. This movement depends on which direction the powered translation means engaged to the conductive member 22 is activated. Thus, the conductive member 22 is configured at the first end to engage with such powered translator, which can be triggered to impart force toward and away from the coupling 24 during use, to both force the welder 12 closed and force it to reopen.

The second end of the conductive member 22 is shaped to engage with the coupling 24 in a locked engagement therewith, which holds the conductive member 22 locked to the coupling 24. Such a locked engagement is preferable because while force communicated to the conductive member 22 in a direction toward the coupling 24 will keep the two engaged, when that force is reversed, to power the welder 12 back to an open configuration without the lock the conductive member 22 would separate from the coupling 24. The coupling 24, in preferred modes, is in a pivoting connection 23 to the first member 14 such that it will conduct electricity once the conductive member 22 is energized. The pivoting connection 23, thus, will communicate electric current from the coupling 24 to the first arm 14 and the first electrode 18 once the conductive member 22 is energized.

As shown in FIG. 3-4, the device 10 herein is configured so the conductive member 22 has a tapered portion 30 sized and configured to engage in a self locking, electrically conductive engagement, within a passage 28 axially formed into a first end of the coupling 24. The second end of the coupling 24 is adapted for operative pivoting engagement 23 with the chosen arm of the C-type or X-type spot welder 12.

As noted and shown in FIGS. 3-4, depicting the conductive member 22 herein in a locked engagement with the coupling 24, this translating conductive member 22, such as shown in FIGS. 2 and 6, is insulated and electrically isolated from the surrounding housing 26. The surrounding housing 26 is configured for removable engagement to a fixed-position of one of the arms of the C-type or X-type spot welder 12, here shown as second arm 16. The housing 26 is configured to position and maintain the conductive member 22 axially aligned, when it translates under the force in either direction which is imparted to the first end thereof as noted above. The conductive member 22 is also adapted for engagement on the first end 21 thereof, with a source of high amperage electric current which is employed to achieve the spot weld such as an electric cable engaged therewith.

In between the first end and second end of the conductive member 22 is positioned a tapered portion 30 which preferably has a tapered exterior surface 41 which extends circumferentially around the conductive member 22. This circumferentially tapered surface 41 serves to maximize and form an electric contact area of the conductive member 22 against the surface of a tapered wall portion 29 of the passage 28, which is mirrored in size and shape and formed in the coupling 24.

An annular recess 36 formed into the exterior circumferential surface of the conductive member 22, is configured to frictionally engage with at least one and preferably a plurality of balls 38, which will bias and project into the passage 28 of the coupling 24 to a projecting position. The balls 38 are located in a ball passage 51 formed into the body of the coupling 24.

The balls 38 are biased to maintain this projecting position by a biasing member such as a spring 40 shown in FIGS. 3 and 6, which forces the ring 25 engaged around and sliding upon an exterior surface area 37 of the coupling 24, toward a contact with a first ledge 27. This first ledge 27 extends from the exterior surface of the coupling 24. With the ring 25 biased toward the first ledge 27, an annular slot 35 which has a diagonal wall 42 connecting to a linear wall 44 biases the balls 38 to the projecting position whereafter an interior surface area 39 of the ring 25 will hold the ball 38 to the projecting position of FIG. 4, with the ball 38 projecting into the passage 28 from its position within the ball passage 51. This contact of the ball 38 with the annular recess 36 forms the locked engagement of the conductive member 22 with the coupling 24 as shown in FIG. 4, for example. As noted herein, in this locked engagement the tapered portion 30 of the conductive member 22 is in full contact with the tapered wall 29 formed in mirrored shape within the collar.

In reaching this locked engagement shown in FIG. 4, from the unlocked engagement of FIG. 6, for example, the tapered portion 30 of the exterior surface of the conductive member 22, forms a ramp which extends to a planar or linear portion 31 of the exterior surface. This configuration has been found in experimentation to allow the ball to more easily roll on the tapered portion 30 and then settle into the annular recess 36, than a mode of the conductive member 22 without it.

Further, the ball 38 while in contact with the linear portion 31, may project into the annular slot 35 and contact the diagonal wall 42 of the annular slot 35, to hold the ring 25 spaced from any contact with the first ledge 27 as in FIG. 6. Consequently, this linear portion 31 which runs parallel to the axis 45 of the conductive member 22 is preferred as it provides for an easier engagement of the conductive member 22 into the passage 28.

In operation, when the conductive member 22 is pushed into the passage 28 of the coupling 24, the force of the balls 38 running up the formed ramp defined by the tapered wall portion 29 and across the linear potion 31, is sufficient to overcome the biasing force of the spring 40. This will force the balls 38 out of the way and concurrently slide the ring 25 in a direction away from the first ledge 27 when the ball 38 is forced against the diagonal wall 42 of the annular slot 35 in the ring 25. This action actuates an automatic sliding of the ring 25 away from the annular first ledge 27 to a position allowing the ball 38 to move along the tapered portion 30 and linear portion 21 of the exterior surface of the conductive member 22.

During this engagement process, as the conductive member 22 is translated by force into the passage 28, the balls 38 travel up the formed ramp of the tapered wall portion 29 to a peak and onto the linear potion 31, where they project a distance both into the passage 28 and into the annular slot 35 and against the diagonal wall 42 thereof. The balls 38 in this slightly projecting position, thereafter encounter and are biased into the annular recess 36, by the force of the spring 40 or other biasing member, biasing the ring 25 toward the first ledge 27.

In this fashion, the balls 38 are held in a biased engagement in the recess 36 formed annularly into the exterior of the conductive member 22. This projection and contact of one or a plurality of the balls 38 in the annular recess 36 forms a removable locked engagement of the conductive member 22 projecting within the passage 28 with the tapered portion 30 of the conductive member 22 in contact and electric communication with the tapered wall portion 29 of the passage 28. This locked engagement is maintained until released by sliding the ring 25, with sufficient force to overcome the biasing member such as the spring 40, in a direction away from the first ledge 27.

As noted, with the conductive member 22 in this removable engagement with the coupling 24, a force imparted to translate the conductive member 22 in either direction will cause movement of the arm engaged to the coupling 24. Thus, the force imparted to the conductive member 22, locked in engagement by the balls 38 to the coupling 24, is employable to close the arms of the spot welder 12 on a point on metal to spot weld that point. So engaged, the force of the conductive member 22 in a reverse direction is employable to open the arms and release such a contact with metal, to allow removal of the spot welder 12.

Additionally shown in FIGS. 4 and 6 are an internal passage 29 which may run axially through the conductive member 22. This passage 29 can be used to communicate cooling fluid to the spot welder 12 once the conductive member 22 is engaged with the coupling 24. A coolant passage 33 formed into the coupling 24 is in sealed engagement with coolant conduits formed in one or preferably both of the first and second arms of the spot welder 12, to thereby communicate cooling fluid to positions adjacent one or preferably both electrodes. Such provides cooling during use.

The device 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described, may be employed for providing a portable resistance welder multi-purpose attachment device in accordance with the spirit of this invention, and such changes, alternations and modifications as would occur to those skilled in the art are considered to be within the scope of this invention as broadly defined in the appended claims. As such, while the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth in the following claims.

What is claimed is:

1. An electrical connector for removably engaging a welder to a spot welding tool having a first arm in a pivoting engagement to a second arm, comprising:
   a conductive member having a first end engaged to a translating shaft of a welder, said translating shaft being surrounded by a housing;
   a coupling, said coupling in a connection at a first end, to a first arm of said spot welder tool;
   a connector for engaging said housing, said connector engaged to one end of a second arm of said spot welder tool;
   said conductive member having a second end, said second end slidably engageable to a locked engagement with said coupling within a passage extending axially into said coupling from a second end of said coupling; and
   wherein movement of said translating shaft in a first direction toward said coupling rotates said first arm to move a first electrode engaged thereto toward a second electrode engaged to said second arm, wherein electric current communicated from said welder will energize said first electrode and said second electrode to form a spot weld on metal placed therebetween.

2. The electrical connector of claim 1, additionally comprising:
   an exterior surface of said conductive member having a tapered portion thereof;
   an interior surface of said passage extending into said coupling having a tapered section thereof; and
   said locked engagement positioning said exterior surface of said conductive member within said tapered portion in contact with said tapered section of said interior surface of said passage.

3. The electrical connector of claim 1, additionally comprising:
   said connection of said coupling at said first end thereof, being a rotational engagement with said first arm.

4. The electrical connector of claim 1, additionally comprising:
   a collar slidably engaged around an exterior surface of said coupling;
   at least one ball positioned with in a ball passage extending between said exterior surface of said coupling and said passage of said coupling;
   a biasing member biasing said collar toward said second end of said coupling to a locking position;
   an interior surface of said collar biasing said ball within said ball passage to a position having a portion of said ball projecting into said passage of said collar;
   an annular recess formed into said exterior surface of said conductive member; and
   said locked engagement formed by said portion of said ball projecting into said passage of said collar being positioned within said annular recess.

5. The electrical connector of claim 2, additionally comprising:
   a collar slidably engaged around an exterior surface of said coupling;
   at least one ball positioned within a ball passage extending between said exterior surface of said coupling and said passage of said coupling;
   a biasing member biasing said collar toward said second end of said coupling to a locking position;
   an interior surface of said collar biasing said ball within said ball passage to a position having a portion of said ball projecting into said passage of said collar;
   an annular recess formed into said exterior surface of said conductive member; and
   said locked engagement formed by said portion of said ball projecting into said passage of said collar being positioned within said annular recess.

6. The electrical connector of claim 3, additionally comprising:
   a collar slidably engaged around an exterior surface of said coupling;
   at least one ball positioned within a ball passage extending between said exterior surface of said coupling and said passage of said coupling;
   a biasing member biasing said collar toward said second end of said coupling to a locking position;
   an interior surface of said collar biasing said ball within said ball passage to a position having a portion of said ball projecting into said passage of said collar;
   an annular recess formed into said exterior surface of said conductive member; and
   said locked engagement formed by said portion of said ball projecting into said passage of said collar being positioned within said annular recess.

* * * * *